United States Patent [19]

Janka et al.

[11] Patent Number: 4,701,266
[45] Date of Patent: Oct. 20, 1987

[54] SOLIDS DEWATERING APPARATUS AND PROCESS

[75] Inventors: John C. Janka, Forest Park; Frank C. Schora, Palatine; Ted M. Knowlton, Hinsdale, all of Ill.

[73] Assignee: Hycrude Corporation, Chicago, Ill.

[21] Appl. No.: 854,168

[22] Filed: Apr. 21, 1986

Related U.S. Application Data

[63] Continuation-in-part of Ser. No. 600,306, Apr. 13, 1984, abandoned.

[51] Int. Cl.$^4$ ................... B01D 21/00; B01D 23/00
[52] U.S. Cl. ........................... 210/803; 210/738; 210/800; 210/523; 210/524
[58] Field of Search ............ 210/520, 523, 528, 803, 210/532.1; 422/273, 233, 137; 198/548; 48/86 R; 162/246; 209/464

[56] References Cited

U.S. PATENT DOCUMENTS

| 2,873,032 | 2/1959 | Henry | 210/524 |
| 3,429,773 | 2/1969 | Richter | 162/246 |
| 4,017,270 | 4/1977 | Funk et al. | 48/86 R |
| 4,297,208 | 4/1981 | Christian | 210/523 |
| 4,379,049 | 4/1983 | Bassett | 209/464 |
| 4,448,678 | 5/1984 | Gentry | 209/464 |

Primary Examiner—S. Leon Bashore
Assistant Examiner—K. M. Hastings
Attorney, Agent, or Firm—Thomas W. Speckman; Ann W. Speckman

[57] ABSTRACT

An apparatus and process for liquid removal from a mixture with solid particulate materials utilizing a screw conveyor within a housing for transport of solids, the screw conveyor upcoming side being in proximity to the housing means and the screw conveyor downcoming side being spaced from at least a portion of the housing means to form a liquid collection volume from which the liquid is removed.

19 Claims, 5 Drawing Figures

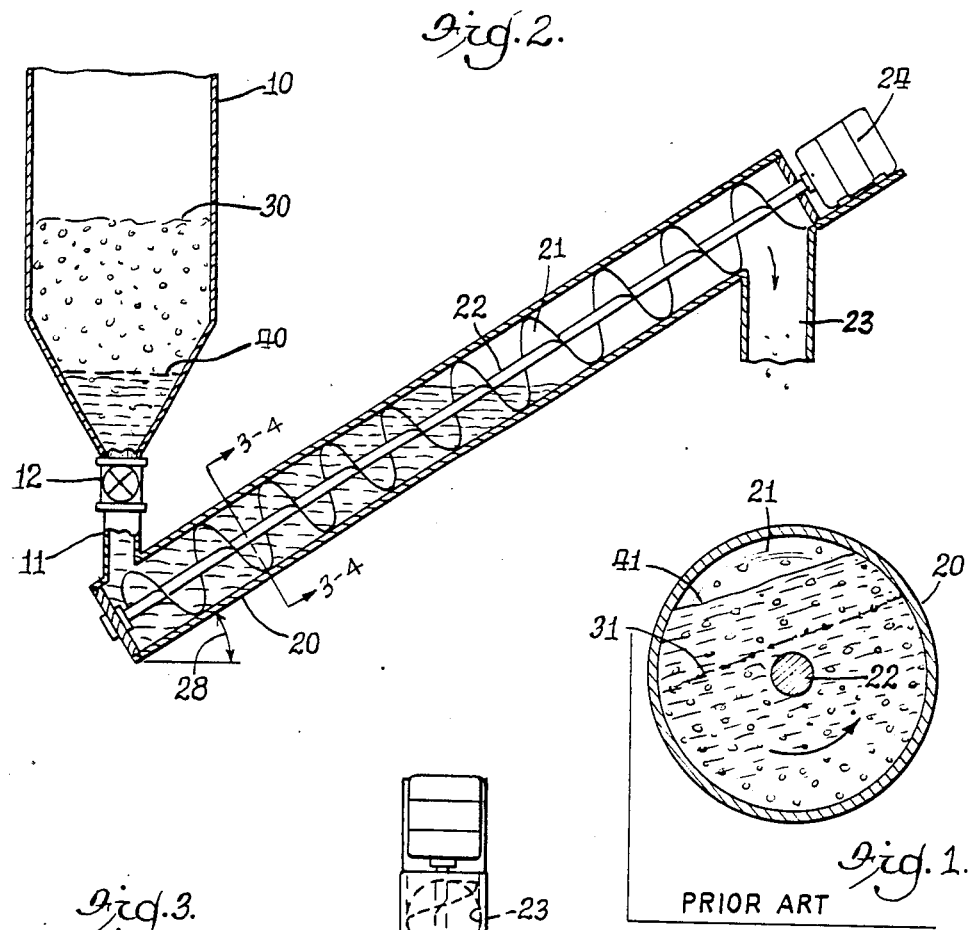
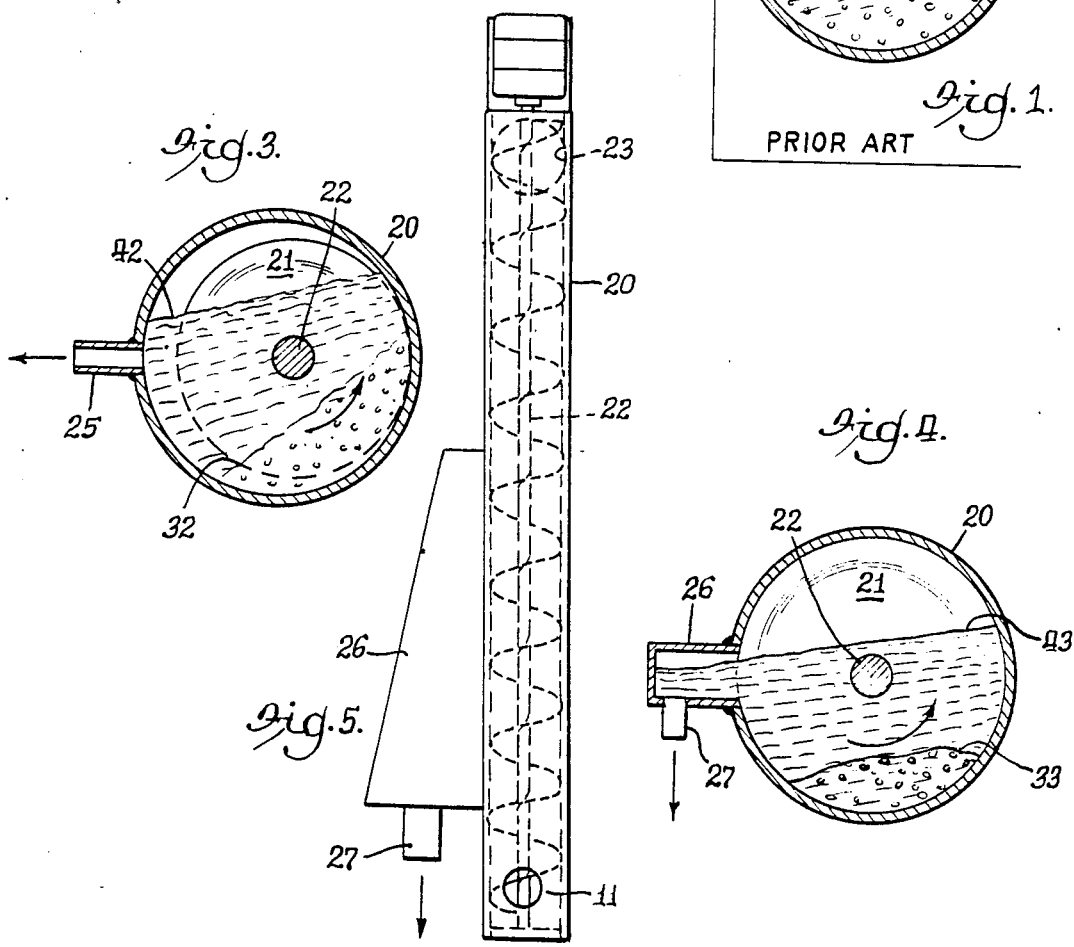

SOLIDS DEWATERING APPARATUS AND PROCESS

CROSS REFERENCE TO RELATED APPLICATION

This application is a continuation-in-part of our co-pending application, Ser. No. 600,306, filed Apr. 13, 1984, now abandoned.

BACKGROUND OF THE INVENTION

1. Field of the Invention

This invention relates to an apparatus and process for conveyance of solids by a screw conveyor operated in an inclined position to deliver solids which are relatively free of surface liquids. Solids are frequently transferred between zones of substantially different pressures wherein the solid materials are supplied to a liquid containing lockhopper and the solid materials with associated liquid are introduced to an inclined screw conveyor for passage to a vessel such as a pressurized reaction vessel. The liquid in the lockhopper acts as a liquid seal between the pressurized reaction vessel and the lockhopper feed supply which is at a much lower pressure. Utilization of the solids dewatering screw conveyor according to the present invention provides solid materials substantially free of liquids being passed to a vessel, such as a pressurized reaction vessel after being passed through a liquid sealed lockhopper.

2. Description of the Prior Art

The prior art has recognized the need for an improved apparatus and process for conveyance of solids from a zone wherein the solids are contained in a liquid to a zone wherein the solids are desirably substantially free of the liquid, the solids and liquid being separated within the conveyance system. This is especially true for coal or oil shale reactor applications where the solids are most desirably as dry as possible. The problems in solids separation from liquids during solids conveyance increase when continuous high speed conveyance is desired.

One means of conveying and separating solid particles from a liquid is by drag bar conveyors or forked tine systems such as exemplified by U.S. Pat. No. 4,322,184. Similarly, perforated buckets mounted on an endless belt have been used for conveying and separating solid materials from liquids, such as taught by U.S. Pat. No. 4,401,402. However, these systems do not provide desired solids-liquid separation, especially at high speed conveyance.

Feeding of solids from a liquid sealed solids lockhopper to a pressurized reactor by screw conveyors is well known as exemplified by U.S. Pat. No. 3,729,105. The recognition of undesired liquid carryover into a pressurized reactor and the need for further solids/liquid separation and one solution has been taught by U.S. Pat. No. 4,247,240 wherein solid materials are transferred from a liquid filled lockhopper by a conveying screw to a solids/liquid separator chamber wherein solids are passed over a screen separator permitting the liquid to fall to a reservoir at the bottom and the solids pass substantially liquid-free into the pressurized reactor. There have been several attempts to improve solids/liquid separation during transport by screw conveyors. One such attempt of improved solids separation from liquids in the screw conveyor itself is taught by U.S. Pat. No. 4,270,447 teaching an upwardly inclined helical screw with decreasing diameter towards its upper portions to "squeeze" out much of the water from very fine particulates, such as coal dust and cement. In another approach, U.S. Pat. No. 3,062,129 teaches a helical screw conveyor which revolves within a perforated cylinder and squeezes the solids to extract the liquid sideways through a perforated inner housing to drain downwardly. Various screw conveyor systems providing liquid removal through wall screens are taught by U.S. Pat. Nos. No. 3,950,146, 3,950,147, and 4,017,270. Drag bar conveyors are also known with wall screens to provide liquid removal through the screened openings. Such systems present problems with screen clogging by fines and with larger solids jamming in screen slots and scoring the housing or fracturing the screens.

Seeking to avoid these disadvantages in the separation of solids from liquids in an inclined helical screw conveyor, it has been proposed to provide the flights of a helical conveyor with cutout portions adjacent the shaft to separate liquid from particulate material and allow passage of the liquid downwardly along the inclined conveyor system as shown in U.S. Pat. No. 4,297,208. The U.S. Pat. No. 4,297,208 recognizes that when in operation the surface of the solids being conveyed lie at an angle to the horizontal and toward the upcoming side of the screw as shown in FIG. 4 of that patent. The U.S. Pat. No. 4,297,208 teaches the corner of the housing beneath the upcoming side of the screw conveyor is spaced a greater distance from the flight to allow higher efficiency in draining the liquid from the particulate material.

SUMMARY OF THE INVENTION

This invention provides a solids conveyor for continuous liquid removal from a mixture with solid particulate materials while being conveyed by an inclined, rotatable, screw conveyor within a housing. The screw conveyor, when in rotating motion, has an upcoming side and an opposite downcoming side. The upcoming side of the screw conveyor is in proximity to the housing while the downcoming side of the screw conveyor is spaced from at least a portion of the housing which extends outwardly from the downcoming side of the screw conveyor below the quiescent level of the liquid forming a liquid collection volume in unobstructed communication with the downcoming side of the screw conveyor. When in operation, in the presence of a mixture of solid particles and liquid, the solid particles will concentrate toward the upcoming side of the screw flight for upward movement. The liquid volume present in a corresponding screw flight will tend to concentrate toward the downcoming side of the screw flight and may be readily withdrawn through a liquid collection volume spaced from and in unobstructed communication with the downcoming screw flight without the need for screens or solids separators. By the terminology "proximity" as used throughout this description and claims, we mean that the screw flights are close to the housing for good linear movement of the solids as determined by the solids particle size; by the terminology "spaced", we mean that the screw flights are spaced from the housing sufficiently far for adequate fluid drainage; and by the terminology "unobstructed communication", we mean without any type of screen or grating of a size which would retain solid particles of the size used. A liquid collection area in the plane normal to the axis of the screw conveyor when integrated along the screw axis forms the liquid collection volume.

The liquid collection volume may be provided on the downcoming side of the screw conveyor by providing an oversized conveyor housing with the screw conveyor offset in the oversized housing and in proximity to the upcoming side of the screw flights. This arrangement leaves the downcoming screw flights spaced from the conveyor housing and provides ample space for unobstructed flow of liquid to the liquid collection volume and for downward flow of liquid through the liquid collection volume for removal from the lower portion of the inclined housing, or removal conduits may be provided from the liquid collection volume along the length of the housing. In another embodiment, the housing may form a liquid collection chamber which extends outwardly below the quiescent liquid level and provides unobstructed communication along the downcoming side of the screw flights which operate otherwise within a concentric housing. The liquid collection chamber may advantageously be increased in size toward the lower portion of the inclined screw conveyor housing and be in direct unobstructed communication with the interior of the housing by an open slit. In either configuration, the upcoming flights of the screw conveyor may be operated in proximity to the wall of the housing so as to insure effective upward movement of the solid particles.

The superior solids/liquid separation of the present invention is achieved by providing solids loading such that concentrated solids occupy less than about 20 percent of the cross-sectional area of the screw and preferably about 15 to 20 percent of the cross-sectional area of the screw. It is also desired that the screw conveyor be rotated at a velocity to provide the axial speed of the solids transported by the screw conveyor be less than about 20 feet per minute, preferably about 11 to about 18 feet per minute, and that the angle of inclination of the inclined screw conveyor be greater than about 20 and less than about 45 degrees from the horizontal, preferably about 25 to about 35 degrees from the horizontal, and most preferably about 30 to about 35 degrees. It is also desirable in order to obtain the good separation of solids from liquids according to this invention, to provide that the vertical height of the screw above the quiescent liquid level in the screw conveyor be more than about 2½ screw diameters and preferably more than about 3 feet. It is readily apparent that there is no upper limit to length of the screw conveyor above the quiescent liquid level, other than the practicality of the physical arrangement. This invention may provide screws of large diameter and high capacity without reference to the fact that the area of annular space between the screw flights and the housing must decrease as a fraction of the total screw area as the diameter increases.

It is an object of this invention to provide an apparatus and process for continuous liquid removal from a mixture of solid particulate materials and liquid simultaneous with the conveyance of solids.

It is another object of this invention to provide more complete liquid removal from solids than previously achieved in screw conveyors.

It is yet another object of this invention to provide a simplified means of removing liquid in an unobstructed manner from a liquid/solids mixture which does not require the use of screens or gratings which may become clogged.

It is yet another object of this invention to provide a process and apparatus for removal of liquids from a mixture of liquid/solids while the solids are being conveyed by a screw conveyor from a liquid sealed lockhopper to a pressurized reaction vessel.

BRIEF DESCRIPTION OF THE DRAWINGS

The above and further features of this invention will become apparent, and the invention will be best understood by reference to the following description of preferred embodiments when read in conjunction with the drawing wherein:

FIG. 1 shows a cross section of a typical screw conveyor of the prior art;

FIG. 2 shows a schematic representation of a sectional side view of an apparatus for carrying out one embodiment of this invention;

FIG. 3 shows a sectional view through the section indicated as 3—3 in FIG. 2 of a helical screw arrangement within a casing according to one embodiment of this invention;

FIG. 4 shows a sectional view through the section indicated as 4—4 in FIG. 2 of a helical screw arrangement within a casing according to another embodiment of this invention; and FIG. 5 is a top view of the apparatus in the embodiment shown in FIG. 4.

DESCRIPTION OF PREFERRED EMBODIMENTS

FIG. 1 is a cross-sectional area of a screw conveyor showing the configuration of the apparatus and the method of use according to the prior art and prior practices. The screw conveyor with screw flight 21 is rotated by shaft 22 in fixed relation to screw flight 21 within concentric screw conveyor housing 20. In prior practice, it has been desired to have screw flights 21 closely spaced to symmetrical concentric housing 20 to insure upward movement of the solid particles while at the same time providing sufficient space between the screw flight and the housing to allow liquid to flow downwardly. In the past, it has been conventional to have a high solids loading so that the solids occupy more than about 50 percent of the cross-sectional area of the screw flight as indicated by dense solids level line 31 with liquid level 41 filling a substantial portion of the cross-sectional area. As previously mentioned, it has been recognized by the prior art that when in operation, the surface of the dense solids level 31 and the liquid surface level 41, generally to a lesser degree, are at an incline to the horizontal, being located upwardly of the horizontal on the upcoming side of the screw flight.

FIG. 2 schematically shows a general side view of an apparatus according to this invention wherein solids are provided from lockhopper 10 through a liquid seal zone by conduit 11 to the lower portion of solid, pressure-tight generally cylindrical screw conveyor housing 20. Flow of the solids is controlled by lockhopper valve 12. Within screw conveyor housing 20 is located a helical screw having screw flights 21 fixed in non-rotatable relation to screw shaft 22 which may be rotated by motor 24. Helical screw with flights 21 is mounted within housing 20, as best seen in FIG. 3, in a manner such that when in rotating motion, the upcoming side of screw flights 21 is in proximity to and in unobstructed communication with housing 20 and the opposite downcoming side is spaced from housing 20 to form a liquid collection volume in unobstructed communication with the downcoming side of the helical screw. In the embodiment shown in FIG. 3, housing 20 is of larger diameter than helical screw flights 21 and helical screw shaft 22 is mounted within housing 20 in an off-center relationship to provide the upcoming side of screw flights 21 in proximity to housing means 20, while the opposite downcoming side of screw flights 21 is spaced from housing 20 to provide a liquid collection volume in unobstructed communication with the downcoming side of the helical screw. With the low solids loading according to this invention, the solids, during rotation of the helical screw, will be located as shown in FIG. 3 in a zone wherein screw flights 21 are in proximity to housing 20 thereby providing good upward conveyance of the solids. As shown in both FIGS. 3 and 4, screw flights 21 are solid. It should be noted that the apparatus and process of this invention is directed to liquid removal from a liquid-solids mixture of solid particulate materials of average diameters of greater than about ¼ inch, preferably about ¼ to about 2 inches, and is not directed to the separation of solids from a fine solids-liquid mixture, such as muds or sands. It is preferred that a very low proportion, and particulary preferred that substantially none of the solid particulate materials removed from the upper portion of the screw conveyor have diameters of less than about ⅛ inch. Likewise, the liquid collection volume formed between housing 20 and the spaced downcoming side of screw flights 21 provides ample volume for drainage of the liquid downwardly for removal through liquid withdrawal conduit 25. Since the solids concentration in the region of liquid withdrawal conduit 25 will be very small, particularly larger solids, liquid withdrawal conduit 25 may be operated in unobstructed communication without any screen or clogging.

Another embodiment of a liquid collection volume is illustrated in FIG. 4 wherein helical screw with flights 21 mounted on shaft 22 is on a centerline common with the centerline of screw conveyor housing 20. Screw conveyor housing 20 is provided with liquid collection chamber 26 extending the housing wall outwardly from the downcoming side of screw flights 21 in a zone near the top of liquid level 43. It is thus seen that liquid collection chamber 26 operates in the same unobstructed communication as the liquid collection volume provided by the offset conveyor screw shown in FIG. 3. As shown in the top view of FIG. 5, liquid collection chamber 26 may be increased in volume, or cross-sectional area, toward the lower region of inclined screw conveyor housing 20 below the quiescent level of the liquid to provide rapid liquid removal from the screw conveyor. Liquid collection chamber 26 is in unobstructed open communication with the interior of screw conveyor housing 20 without screens or grids which lead to clogging. A suitable liquid withdrawal conduit 27 is provided in the lower region of liquid collection chamber 26. Liquid withdrawn through liquid withdrawal conduits 25 or 27 may be recycled to the liquid sealed lockhoppers.

It is readily apparent upon reading of this description that other physical configurations may be used to provide the desired proximity of the upcoming side of a screw conveyor and spaced, unobstructed communication relationship of the downcoming side of a screw conveyor from a housing for the screw conveyor.

The apparatus for use in the process of this invention may be appropriately sized according to specific needs and may be constructed of any suitable materials as will be apparent to one skilled in the art dependent upon pressures involved, desired feed rates, and the like.

The process of this invention for liquid removal from a mixture with solid particulate materials is practiced by feeding the mixture of liquid and solid particulate materials to the lower portion of an inclined screw conveyor means within a housing means, the screw conveyor means when in rotating motion having an upcoming side and an opposite downcoming side, the upcoming side being in proximity to the housing means and the downcoming side spaced from and in unobstructed communication with at least a portion of the housing means to form a liquid collection volume. The solid particulate materials are present in the mixture in the lower region of the inclined screw conveyor in an amount of less than about 20 volume percent of the mixture, preferably about 15 to about 20 volume percent. The screw conveyor means is rotated at about 5 to about 15 revolutions per minute, a velocity causing axial movement of the solid particles at less than 20 feet per minute, and preferably about 11 to about 18 feet per minute, and causing movement of the solid particles toward the upcoming side of the screw conveyor means and movement of the liquid toward the downcoming side of the screw conveyor means. The rotation of the screw conveyor means causes upward movement of the particulate materials through the housing means and inclination of the housing means at more than about 20° and less than about 45° to the horizontal causes movement of liquid in the liquid collection volume downwardly for removal from the housing. Upward movement of the solid particulate materials by the screw conveyor means is continued for a vertical height of at least two times the diameter of the screw conveyor means above the quiescent liquid level. The solid particulate materials, substantially free of surface liquid are then removed from the upper portion of the screw conveyor means. We have found a mixture of oil shale and water can be treated with the apparatus and process of this invention to result in less than about 0.5 weight percent water associated with the treated solids.

The apparatus and process of this invention is suitable for use with solids sized for a variety of chemical operations, such as gasification or liquefaction of coal and oil shale, having average particulate diameters about ¼ to about 2 inches. The process of this invention is not suitable for separation of smaller sized solids which tend to slurry in the liquid, such as muds and sand. When such smaller sized solids are introduced incidentally with the solids-liquid mixture to the apparatus of this invention, they are carried off with the liquid while the larger solid particulates are separated from the liquid.

The following examples are set forth showing in detail the practice of one embodiment of this invention. The specific information set forth in the examples should not be considered as limiting this invention in any way.

EXAMPLE I

Oil shale solid particles screened to a particle size of minus 1¼ inch were loaded into a water sealed lockhopper-helical screw solids feeder as generally shown in FIG. 1. The helical screw had an outside diameter of 24 inches and a flight pitch of 0.67. The helical screw was mounted in a housing providing that the upcoming side of the screw flights was in proximity to the housing wall and the downcoming side of the screw flights spaced away from the housing wall approximately 1¼ inch. The center line of the helical screw was at an angle of inclination of 20 degrees with respect to the horizontal and there was a vertical height of 4 feet 10 inches above the quiescent liquid level in the screw housing. The helical screw was rotated at differing revolutions per minute as noted in the table below with resulting indicated solids flow rate and water carryover.

| Screw Rotation Rate (Revolutions per minute) | 8 | 10 | 13 |
|---|---|---|---|
| Solids Flow Rate (Tons per hour) | 19 | 29 | 42 |
| Solids Axial Velocity (Feet per minute) | 10.7 | 13.4 | 17.4 |
| Water Carryover (Weight percent of total material delivered by screw) | 0.3 | 1.3 | 5.5 |

Visual observation of the helical screw operation showed that the solids moved toward the upcoming side of the screw and the liquids moved toward the downcoming side of the screw. Increasing of the solids loadings or operation of the helical screw at above about 15 revolutions per minute increased the solids concentration on the downcoming side of the screw preventing the liquid drainage mechanism of this invention from operating.

EXAMPLE II

The same oil shale as described in Example I was fed to the same helical screw as defined in Example I except that the angle of inclination of the helical screw was increased to 32 degrees and the vertical height of the screw above the quiescent liquid level was increased to 10 feet. The corresponding results are set forthin the table below.

| Screw Rotational Rate (Revolutions per minute) | 8 | 10 | 13 |
|---|---|---|---|
| Solids Flow Rate (Tons per hour) | 18 | 27 | 35 |
| Water Carryover (Weight percent of total material delivered by screw) | 0 | 0 | 0.25 |
| Solids Axial Velocity (feet/minute) | 10.7 | 13.4 | 17.4 |

Visual observation of the helical screw operation showed that the solids moved toward the upcoming side of the screw and the liquids moved toward the downcoming side of the screw. Increasing of the solids loadings or operation of the helical screw at above about 15 revolutions per minute increased the solids concentration on the downcoming side of the screw preventing the liquid drainage mechanism of this invention from operating.

While in the foregoing specification this invention has been described in relation to certain preferred embodiments thereof nd many details have been set forth for purpose of illustration, it will be apparent to those skilled in the art that the invention is susceptible to additional embodiments and that certain of the details described herein can be varied considerably without departing from the basic principles of the invention.

We claim:

1. In an apparatus for continuous liquid removal from a mixture with solid particulate materials, said apparatus comprising: an inclined, rotatable, screw conveyor means within a pressurized, generally cylindrical housing means, said screw conveyor means having solid helical flights capable of providing an axial speed of said solid particulate materials of less than 20 feet per minute and when in rotating motion having an upcoming side and an opposite downcoming side, said upcoming side in proximity to and in unobstructed communication with said housing means and sufficiently close thereto to provide said axial speed of solid particulate materials having average diameters of about $\frac{1}{4}$ to about 2 inches and said downcoming side spaced from at least a portion of said housing means to form a liquid collection volume extending laterally outwardly below the quiescent level of said liquid in unobstructed communication with said screw conveyor means, and liquid removal means in communication with said liquid collection volume for liquid removal, said housing means inclined at an angle of about 20° to about 45° to the horizontal.

2. In the apparatus of claim 1 wherein the rotational axis of said screw conveyor means is offset from the central axis of said housing means toward said housing means in close proximity to said upcoming side of said screw conveyor means.

3. In the apparatus of claim 1 wherein said housing means on the side of said downcoming side of said screw conveyor means has an outwardly extending portion forming said spaced relation to said downcoming side to form said liquid collection volume.

4. In the apparatus of claim 3 wherein said liquid removal means is in said housing means outwardly extending portion.

5. In the apparatus of claim 1 having rotating means for rotating said helical screw at a suitable angular velocity to provide axial conveyance of said solids at about 11 to about 18 feet per minute.

6. In the apparatus of claim 5 wherein said rotating means is capable of rotating said helical screw at about 5 to about 15 revolutions per minute.

7. In the apparatus of claim 1 wherein said inclined, rotatable screw conveyor means is inclined at about 25 degrees to about 35 degrees to the horizontal.

8. In the apparatus of claim 1 wherein the vertical height of said screw conveyor means above the quiescent level of said liquid is greater than about two times the diameter of said screw conveyor means.

9. In the apparatus of claim 1 having rotating means for rotating said helical screw at a suitable angular velocity to provide axial conveyance of said solids at about 11 to about 18 feet per minute, wherein said inclined, rotatable screw conveyor means is inclined at about 25 degrees to about 35 degrees to the horizontal, and wherein the vertical height of said screw conveyor means above the quiescent level of said liquid is greater than about two times the diameter of said screw conveyor means.

10. A process for liquid removal from a mixture with solid particulate materials, said process comprising: feeding said mixture of liquid and solid particulate materials, said solid particulate materials having diameters about $\frac{1}{4}$ to about 2 inches and present in less than 20 volume percent of said mixture, to the lower portion of an inclined screw conveyor means having solid helical flights within a pressurized, generally cylindrical housing means, said solids occupying less than about 20 percent of the cross-sectional area of said screw conveyor means; rotating said screw conveyor means creating an upcoming side and an opposite downcoming side, at an angular velocity causing axial movement of said solid particulate materials at less than about 20 feet per minute and causing aggregating of said solid materials toward said upcoming side of said screw conveyor means in unobstructed communication with said housing means and sufficiently close thereto to provide said axial speed of said solid particulate materials of about ¼ to about 2 inches and collecting of said liquid toward said downcoming side and by unobstructed communication forming a liquid collection volume in an outwardly laterally extending portion of said housing means spaced from said screw conveyor means below the quiescent level of said liquid, maintaining said housing means at an angle of about 20 degrees to about 45 degrees to the horizontal causing downward movement of said liquid in said liquid collection volume; continuing upward movement of said solid particulate materials for a vertical height of at least two times the diameter of said screw means above the quiescent liquid level; removing liquid from said liquid collection means; and removing said solid particulate materials, substantially free of said liquid, from the upper portion of said screw conveyor means.

11. The process of claim 10 wherein said screw conveyor means is offset from the central axis of said housing means toward said housing means in close proximity to said upcoming side of said screw conveyor means.

12. The process of claim 10 wherein said housing means on the side of said downcoming side of said screw conveyor means has an outwardly extending portion forming said spaced relation to said downcoming side to form said liquid collection volume.

13. The process of claim 12 wherein said liquid removal means is in said housing means outwardly extending portion.

14. The process of claim 10 wherein said inclined, rotatable screw conveyor means is inclined at about 25 degrees to about 35 degrees to the horizontal.

15. The process of claim 10 wherein said solid particulate materials fed to the lower portion of said screw conveyor means comprises about 15 to about 20 percent of said cross-sectional area of said screw.

16. The process of claim 10 wherein said axial movement of said solids is about 11 to about 18 feet per minute.

17. The process of claim 10 wherein said screw conveyor means is rotated at about 5 to about 15 revolutions per minute.

18. The process of claim 10 wherein said particulate materials are removed from the upper portion of said screw conveyor means with substantially no solid particulates of less than ⅛ inch diameter.

19. The process of claim 10 wherein said solid particulate materials are removed from the upper portion of said screw conveyor means with less than about 0.5 wt. percent liquid.

* * * * *